July 17, 1951 J. W. DAWSON ET AL 2,560,720

ELECTRONIC TIMING SYSTEM

Filed March 11, 1947 2 Sheets-Sheet 1

INVENTORS
JOHN W. DAWSON
DONALD P. FAULK
BY Elmer J. Gorn
ATTY.

July 17, 1951

J. W. DAWSON ET AL 2,560,720

ELECTRONIC TIMING SYSTEM

Filed March 11, 1947

2 Sheets-Sheet 2

INVENTORS
JOHN W. DAWSON
DONALD P. FAULK
BY Elmer J. Gorn
ATTY.

Patented July 17, 1951

2,560,720

UNITED STATES PATENT OFFICE 2,560,720

ELECTRONIC TIMING SYSTEM

John W. Dawson, West Newton, and Donald P. Faulk, Waltham, Mass., assignors to Raytheon Manufacturing Company, Newton, Mass., a corporation of Delaware Application March 11, 1947, Serial No. 733,901

11 Claims. (Cl. 250—27)

This invention relates to an electronic timing system for producing a square-wave voltage pulse of predetermined timed pulse duration.

One of the objects of this invention is to provide an electronic timing system for producing a square-wave voltage pulse of predetermined pulse duration, the system having a novel circuit arrangement such that the predetermined pulse duration will not be chnaged by variations of the supply voltage for the system.

It is also an object of this invention to provide an improved electronic timing system for predetermining the pulse duration of a voltage pulse produced across a pair of output terminals to be substantially equal to the time duration of an adjustable predetermined number of full cycles of alternating current line voltage energizing the system.

It is yet another object of this invention to provide an improved timing system for producing a square-wave voltage pulse having a pulse duration equal to a predetermined whole number of cycles of alternating current energizing the system, the system having a novel circuit arrangement such that the timing function will not be subject to line voltage amplitude variations and will remain accurate despite such variations of the alternating current line voltage.

It is a further object of this invention to provide an electronic timing system of the type employing thyratron tubes for starting and stopping the timing function and having novel grid bias rectifying circuits for providing oscillating potentials of adjustable waveform having predetermined voltage peaks to be applied to the thyratron control grids and thereby control the initiation of their conduction periods to be coincident with predetermined points in the cycle of the alternating current line voltage energizing the timing system and the grid bias rectifying circuits.

Further objects and advantages of this invention will be apparent upon reference to the following specification and drawings in which.

Figures 1, 8, 9:
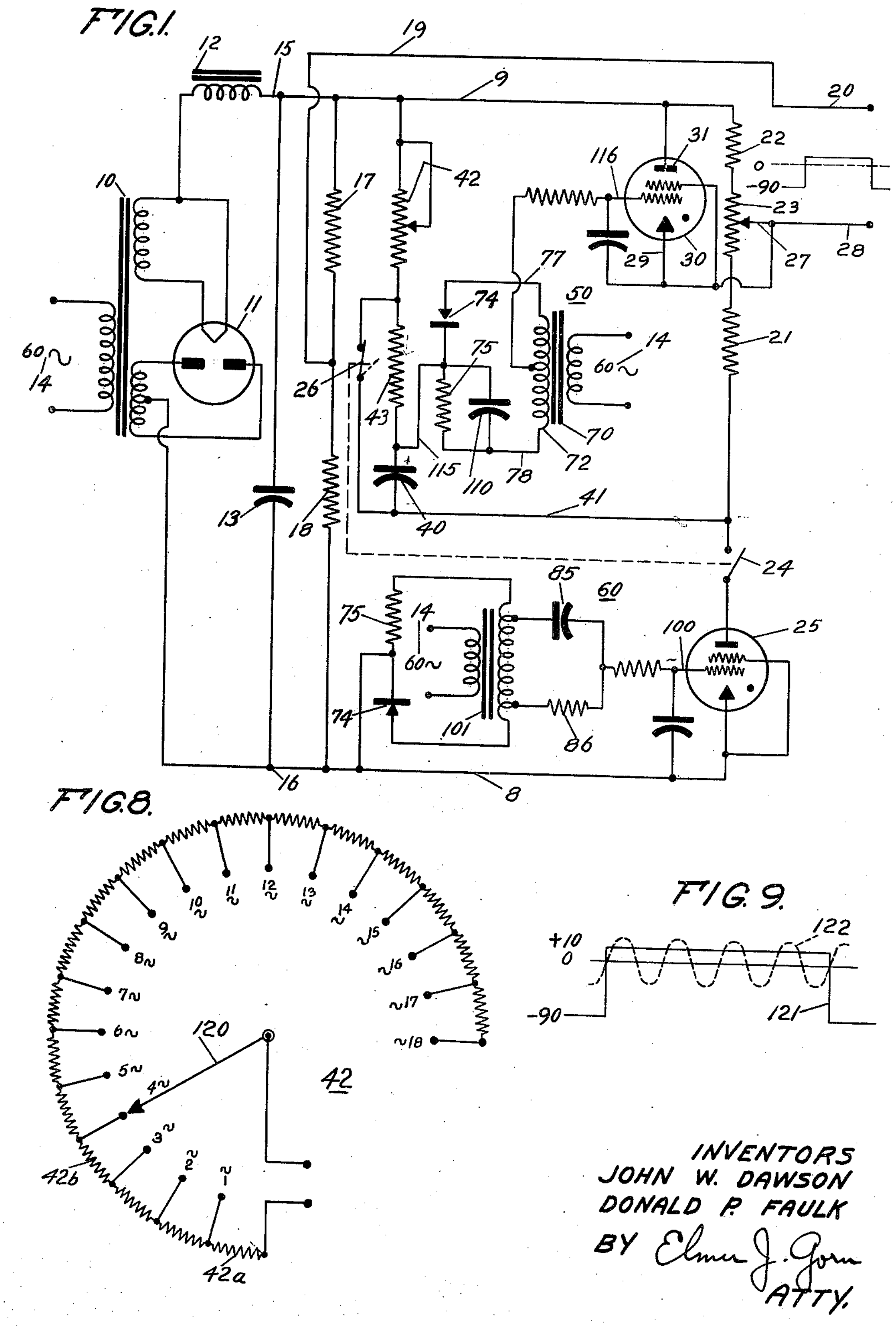
Fig. 1 represents an electrical circuit diagram for the timing system.
Fig. 8 is a detailed circuit arrangement for the adjustable calibration resistor for predetermining the duration of the timed impulse.
Fig. 9 is a curve showing the voltage wave form of the pulse of predetermined pulse duration produced at the output terminals of the timing system and superimposed upon the voltage wave form of the line voltage energizing the system.

Referring to Fig. 1 of the drawings, the timing system is shown to comprise a rectifying circuit including the power transformer 10, full-wave rectifying tube 11, smoothing choke 12, and filter condenser 13, connected in a conventional full-wave rectifying manner. The primary of the power transformer 10 is connected to a suitable source 14 of alternating current line voltage. The rectifying circuit as described provides a direct current output appearing across terminals 15 and 16, the terminal 16 being the negative point of the rectifying system. A voltage divider comprised of resistors 17 and 18 is connected across output terminals 15 and 16. The point intermediate resistors 17 and 18 is connected by line 19 to an output terminal 20 of the timing system. Also connected across the output terminals 15 and 16 of the rectifying circuit, and connected by lines 8 and 9, are the series-connected resistors 21, 22, potentiometer 23, normally open switch 24 and thyratron 25. The normally open switch 24 is ganged to be operated simultaneously with the normally closed switch 26 to be referred to later. The adjustable tap 27 of voltage divider 23 is connected to another output terminal 28 of the timing system and is also connected to the cathode 29 of thyratron 30 whose plate 31 is connected to line 9 and the positive output terminal 15 of the rectifying system.

With the circuit arranged as described thus far, it will be seen that, when the rectifying system is energized, the potential of line 19 will be negative with respect to line 9 due to the voltage drop across resistor 17 and this drop may be, for example, in the order of 100 volts. At the same time, with normally open switch 24 in its normal position, there will be no current flow through resistors 21, 22 and potentiometer 23 so that the potential of the tap 27 and output terminal 28 will be the same as the potential in line 9 which is the maximum positive potential of the rectifying system. Thus, at such time, the potential difference between output terminals 20 and 28 is in the order of 100 volts with output terminal 20 being the more negative. Upon closing the normally open switch 24 and upon permitting thyratron 25 to conduct, current will be passed through the resistors 21, 22 and potentiometer 23 so that, with the adjustable tap 27 in a predetermined position, the voltage drop between line 9 and the output terminal 28 will be in the order of, for example, 110 volts. Thus the terminal 28 becomes more negative than the terminal 20 so that the total potential difference between terminals 20 and 28 is of the order of 10 volts with terminal 20 the more positive. At some later predetermined time, when the thyratron 30 is permitted to conduct, the resistor 22 and a portion of the potentiometer 23 will be short circuited to connect the adjustable tap 27 directly to line 9, again restoring the original condition of approximately 100 volts potential difference between output terminals 20 and 28, with output terminal 20 the more negative.

The timing system of this invention provides for a timing function that is not changed in response to variations of line voltage energizing the system, and also provides for a novel circuit means to control the initiation of the conduction periods of thyratrons 25 and 30, so that the voltage pulse appearing between output terminals 20 and 28 is of a predetermined pulse duration and may be started and stopped at a predetermined point on the cycle of the alternating current line voltage 14.

In order to control the approximate pulse duration, irrespective of line voltage variation, a series connected condenser and resistor circuit having an adjustable time constant is adapted to be charged following the closing of the normally open switch 24 initiating the start of the pulse. Upon the closing of the normally open switch 24, the normally closed switch 26 ganged therewith is opened and a condenser 40 is then connected through line 41, now closed switch 24 and thyratron 25 (when conductive) to be charged through resistances 42 and 43 from the direct current appearing across the rectifier output terminals 15 and 16. Resistor 42 is adjustable and may be calibrated as shown in detail by Fig. 8 of the drawings to be referred to again.

From a study of the circuit thus described, it will be seen that at the moment of initiating the pulse and opening switch 26, the condenser 40 will have no charge and the grid bias on the control grid of thyratron 30 will be determined in effect by the voltage drop through resistor 21 and a portion of potentiometer 23 to the tube cathode 29. This voltage being negative is applied in series with an auxiliary grid bias voltage from the source 50 to be referred to later, and to the control grid 116 of thyratron 30, thus preventing it from conducting. As the condenser 40 is progressively charged, however, through the adjustable resistor 42, resistor 43, now closed switch 24 and conducting thyratron 25, its charge is added vectorially to the grid bias voltage drop across resistor 21 and a portion of potentiometer 23 to progressively cause the control grid of thyratron 30 to become less negative until such time when the thyratron 30 becomes conductive at the end of the pulse duration as determined by the charging rate of condenser 40. It will be noted that the charging rate of condenser 40 is dependent upon the setting of the adjustable resistor 42 and also upon the applied potential which in the case of line voltage variations would change the charging rate to disadvantageously change the pulse duration from the predetermined value. However, in the circuit of the present invention, should the applied potential increase to thus increase the charging rate of the condenser 40, the voltage drop across resistor 21 and a portion of potentiometer 23 providing the negative grid bias to the thyratron 30 also increases so that with an increased charging rate for condenser 30, due to increased line voltage, a higher charge must also be obtained across the condenser 40 before thyratron tube 30 will become conductive, and thus the predetermined pulse duration is maintained in spite of line voltage variations.

In order to prevent thyratrons 25 or 30 from becoming conductive except at predetermined times coincident with a predetermined point in the cycle of the alternating current line voltage 14, oscillating grid bias voltage supplies 50 and 60 are provided, which are designed to produce an oscillating output voltage having a peaked voltage waveform with the voltage peaks occurring coincident with predetermined points in the cycle of the alternating current line 14.

Figure 2:
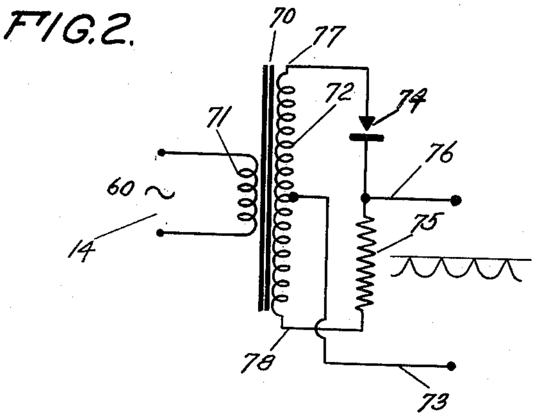
Fig. 2 represents the circuit diagram for the basic full wave rectifying circuit used to supply the oscillating grid bias voltage for the timing circuit controlling thyratron tubes.
Figure 3:
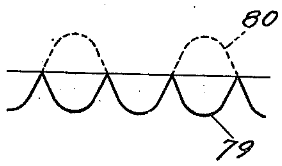
Fig. 3 is a curve representing the voltage wave form at the output terminals of the system of Fig. 2 superimposed upon the wave form of the line voltage.

For a better understanding of the oscillating grid bias voltage supplies, reference will be made to Figs. 2–7 of the drawings. Figs. 2 and 3 relate to the basic circuit providing an oscillating waveform having voltage peaks coincident with predetermined points in the cycle of the alternating current line voltage. A transformer 70 is provided with a primary 71 connected to the alternating current line 14 and is also provided with a center-tapped secondary 72. The center tap of secondary 72 is connected to an output terminal 73 and across the secondary 72 is also connected a rectifying device 74 and resistor 75 in series. The point intermediate rectifying device 74 and resistor 75 is connected to another output terminal 76. Considering the operation of the circuit as shown in Fig. 2, reference will also be made to Fig. 3 of the drawings in which the solid line 79 indicates the output voltage waveform superimposed on the dotted line 80 representing the waveform of the alternating current line voltage 14. When the potential induced at the end 77 of the secondary 72 is positive, the rectifier 74 will conduct and output terminal 76 will be positive with respect to output terminal 73. On the succeeding half-cycle of the line voltage 14, when the end 78 of secondary 72 is positive, the rectifying device 74, assuming a near perfect rectifier, will be non-conductive and there will be no current drawn through resistor 75 and consequently no voltage drop so that output terminal 76 is again positive with respect to output terminal 73. Thus an oscillating voltage appears between output terminals 73 and 74, as shown by the solid line 79 of Fig. 3, with voltage peaks occurring coincident with the voltage peaks of the alternating current line voltage, as shown by the dotted line 80. It is, of coure, recognized that such a wave form of voltage, as represented by line 79, would not be obtained if any appreciable current is drawn from the output of the system, but since these systems are to be used as grid bias potential supplies in which the current drawn is negligible, it will be understood that such voltage waveforms can be obtained.

Figures 4, 6:
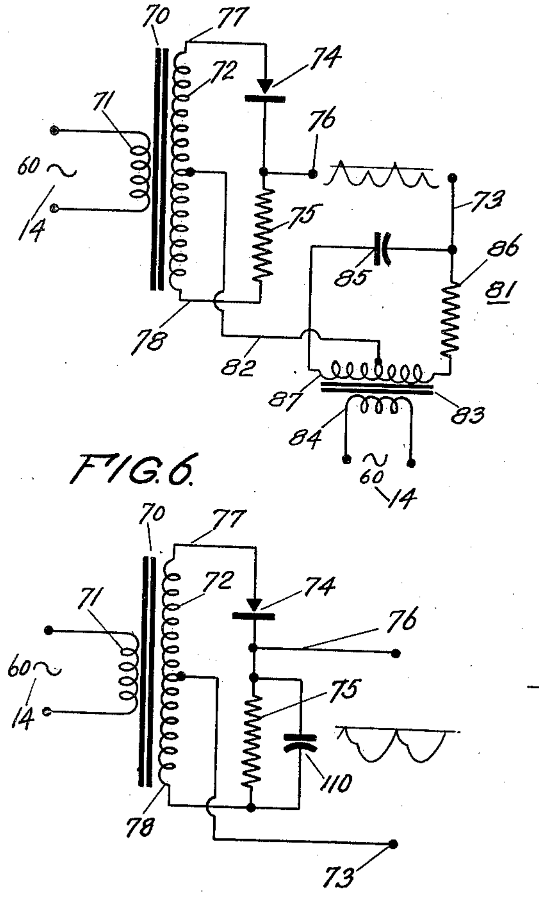
Fig. 4 is a detailed circuit diagram showing modifications of the circuit of Fig. 2 to provide a grid bias system for the timing cycle starting thyratron.
Fig. 6 is a detailed circuit diagram showing another modification of the circuit of Fig. 2 to provide a grid bias system for the thyratron controlling the end of the timing cycle.
Figure 5:
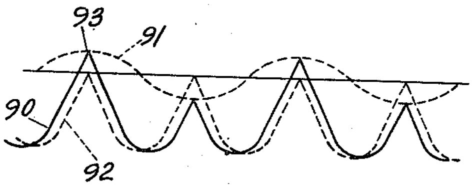
Fig. 5 is a curve representing the voltage wave form at the output terminals of the circuit of Fig. 4 superimposed upon the wave form of the line voltage.

The system of Fig. 2 may be modified as shown by Fig. 4 to include an auxiliary source of phase-shifted current 81, in series with one of the output terminals. Elements of the system of Fig. 4 which are identical to those described in connection with Fig. 2 will be given the same reference numerals and not referred to again. It will be noted that in the system of Fig. 4, the center tap of secondary 72 is connected by line 82 to an auxiliary source of phase-shifted voltage 81 in series with the output terminal 73. The phase-shifting network 81 is comprised of a transformer 83 having a primary 84 connected to the same source of line voltage 14 and a secondary 87 having the usual condenser 85 and resistor 86 for shifting the phase of the voltage appearing across the secondary 87. With reference to the waveform shown in Fig. 5, the solid line 90 represents the resultant oscillating voltage appearing between terminals 73 and 76, the dotted line 91 represents the waveform of the 90° phase-shifted alternating current in the secondary of transformer 83, and the dotted line 92 represents the voltage waveform appearing between the output terminals 76 and line 82. It should be obvious that the resultant voltage represented by the solid line 90, when the waveform of the 90° phase-shifted voltage 91 is vectorially added to the waveform of the voltage 92, will be provided with voltage peaks 93 occurring once for each cycle of alternating current line voltage and at the beginning of each cycle of line voltage.

The grid bias voltage circuit 60 (Fig. 1) used to control the initiation of the conduction of thyratron 25 is the equivalent of the circuit described above in connection with Figs. 4 and 5 of the drawings so that the voltage applied to the control grid 100 of thyratron tube 25 normally prevents its conduction except at the beginning of each cycle of alternating current line voltage 14. In the grid bias system 60, transformers 70 and 83 have been combined into a single transformer 101 while all other parts of the system remain the same and are given identical reference numerals with those of Fig. 4. Thus it will be seen that when normally open switch 24 is closed, the thyratron 25 does not become immediately conductive until a point in time corresponding with the occurrence with a predetermined point in the cycle of the alternating current line voltage 14, namely the zero line voltage point.

The circuit of Fig. 2 may be also modified as shown by Fig. 6 to include a condenser 110 connected across the resistance 75. As has been done in the case of Fig. 4, all circuit elements of Fig. 6 which are identical with that of Fig. 2 will be given identical reference numerals and will not be referred to again. The waveform of the voltage thus appearing across output terminals 73 and 76 when using such condenser 110 will be modified somewhat as shown by the solid line 111 of Fig. 7 superimposed on the dotted line 112 representing the voltage waveform obtained from the system of Fig. 2. When the point 77 is positive and the rectifier 74 is conductive, condenser 110 will be charged and will discharge exponentially during the succeeding half-cycle so that the resultant output waveform is essentially, as shown by the solid line 111, one having a minimum negative voltage peak occurring, as at 113, once during each cycle of the alternating current line voltage and at the beginning of each cycle corresponding to zero line voltage.

Figure 7:
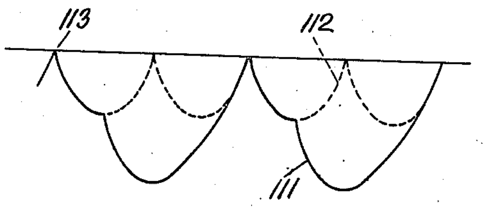
Fig. 7 is a curve representing the voltage wave form appearing at the output terminals of Fig. 6.

The source of oscillating grid bias voltage 50 controlling the initiation of conduction for thyratron 30 is the same as that just described in connection with Figs. 6 and 7 of the drawings and identical voltage reference numerals are employed. The positive terminal of the system 50 is connected to the point intermediate condenser 40 and resistor 43 and its negative terminal is connected to the control grid 116 of thyratron tube 30. Thus, after normally open switch 24 is closed and thyratron 25 becomes conductive as hereinbefore explained, the voltage pulse appearing across the output terminals 20 and 28 is started and normally closed switch 26 is opened to permit condenser 40 to start to charge. When condenser 40 is charged to a predetermined potential sufficient to overcome the normally negative bias voltage drop across resistor 21 and a portion of potentiometer 23 together with the negative bias supplied by the oscillating bias voltage system 50, the grid 116 of thyratron tube 30 will become positive to permit thyratron tube 30 to conduct and short-circuit resistor 22 and a portion of potentiometer 23, thus ending the voltage pulse as previously described. It will be noted that the first point in time at which the potential of condenser 40 could overcome the oscillating negative bias voltage of the system 50 is at a point in time coinciding with a predetermined point in the cycle of the alternating current line voltage 14, namely zero line voltage, in view of the occurrence of the minimum negative voltage peaks 113 as shown by the waveform of Fig. 7.

To reset the timing system, as described, it is necessary to again open switch 24 and close switch 26. Switch 26 discharges condenser 40 and conditions it for a future charging operation to be timed in accordance with the setting of adjustable resistor 42.

Fig. 8 of the drawings is a detailed view of one form of adjustable resistor 42 having tapped sections 42*a*, *b*, etc. The selector switch arm 120 is shown in the drawing to be set to a resistance tap corresponding to a calibrated amount of resistance sufficient to cause condenser 40 to charge to the predetermined magnitude for permitting thyratron 30 to conduct after a predetermined period of time equal to the time duration of four cycles of alternating current line voltage 14. Thus the voltage pulse appearing between the timing system output terminals 20 and 28 will have a pulse duration, as shown by the solid line 121 of Fig. 9, equal to four cycles of line voltage, as shown by the dotted line 122, and in view of the use of the novel oscillating grid bias voltage supplies 50 and 60, the beginning and ending of the pulse is coincident with the same predetermined point in the cycle of line voltage, namely zero line voltage.

It should be understood that the pulse generation system of this invention is not limited to the particular arrangement of oscillating bias voltage supplies for determining the initiation of the conduction of the pulse timing cycle controlling thyratron tubes, since other equivalent means will be suggested to those skilled in the art. In the system as described, a means has been provided for producing a voltage pulse of timed pulse duration which will not be effected by variations in line voltage energizing the system and additional means has been described for predetermining the pulse duration to occur coincident with predetermined points in the cycle of an alternating current. Various other equivalents will suggest themselves to those skilled in the art.

What is claimed is:

1. The system for producing a voltage pulse of predetermined pulse duration comprising a source of potential, a first means connected to said source for initiating said pulse, a second means adapted to be energized for terminating said pulse, means connected to said source for providing a bias potential to prevent the energization of said second means, means comprising a condenser adapted to be charged from said source, said condenser being connected to said bias means such that the charge on said condenser is in opposition to said bias potential, and means for superimposing an alternating voltage on said bias potential to energize said second means when the charge on said condenser has reached a predetermined value with respect to said bias potential, and the alternating potential reaches a predetermined point in its cycle.

2. The system for producing a voltage pulse of predetermined pulse duration comprising a source of potential, a first means connected to said source for initiating said pulse, a second means adapted to be energized for terminating said pulse, means connected to said source for providing a bias potential to prevent the energization of said second means, means comprising a condenser adapted to be charged from said source at an adjustable charging rate, said condenser being connected to said bias means such that the charge on said condenser is in opposition to said bias potential, means for superimposing an alternating potential on said bias potential comprising a source of alternating current, and means connected to said alternating current source for rectifying said alternating current and producing alternating potentials for overcoming said bias potential and energizing said second means when the charge on said condenser has reached a predetermined value with respect to said bias potential, and the alternating current reaches a predetermined point in its cycle.

3. The system for producing a voltage pulse of predetermined pulse duration comprising a source of potential, a first means connected to said source for initiating said pulse, a second means including a thyratron adapted to become conductive for terminating said pulse, means connected to said source for providing a negative bias potential to said thyratron to prevent it from becoming conductive, and means comprising a condenser adapted to be charged at an adjustable rate from said source, said condenser being connected to said bias means such that the charge on said condenser is in opposition to said bias potential, and means for firing said thyratron comprising a source of alternating current and means connected to said alternating source for rectifying said alternating current source and producing voltage pulses of twice the frequency as said alternating current source for combining with the charge on said condenser to energize said thyratron when the charge on said condenser reaches a predetermined value with respect to said bias potential, and said alternating current source reaches a predetermined point in its cycle.

4. The system for producing a voltage pulse of a duration equal to the timed duration of a predetermined number of cycles of alternating current comprising a source of alternating current, a source of direct current, a first voltage divider connected to said direct current source and having a voltage tap connected to a first output terminal of the system, a second voltage divider adapted to be connected to said direct current source and having a voltage tap connected to a second output terminal of the system, the voltage pulse appearing as a change of potential difference between said first and second output terminals, a first means to connect said second voltage divider to said direct current source coincident in time with a predetermined point in the cycle of said alternating current, means including a series connected resistance and condenser circuit having an adjustable time constant and adapted to be progressively charged from said source of direct current following the connection of said first means, and means connected to said condenser and responsive to a predetermined charge on said condenser to connect the voltage tap of said second voltage divider to one end of the second voltage divider at a predetermined time following the connection of said first means and at a predetermined point in the cycle of said alternating current.

5. The system for producing a voltage pulse of a duration equal to the time duration of a predetermined number of cycles of alternating current from the source of line voltage energizing the system comprising rectifying means connected to said source of line voltage for supplying a direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, a first means to connect said second voltage divider to said direct current supplying means coincident in time with a predetermined point in the cycle of the alternating current line voltage, and means to connect the voltage tap of said second voltage divider to one end of the second voltage divider at a predetermined time following the connection of said first means and at a predetermined point in the cycle of the alternating current line voltage.

6. The system for producing a voltage pulse of a duration equal to the time duration of a predetermined number of cycles of alternating current from the source of line voltage energizing the system comprising rectifying means connected to said source of line voltage for supplying a direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, a first means including a thyratron adapted to be fired to connect said second voltage divider to said direct current supplying means coincident in time with a predetermined point in the cycle of the alternating current line voltage, and means including a second thyratron adapted to be fired to connect the voltage tap of said second voltage divider to one end of the second voltage divider at a predetermined time following the connection of said first means and at a predetermined point in the cycle of the alternating current line voltage.

7. The system for producing a voltage pulse of a duration equal to the time duration of a predetermined number of cycles of alternating current from the source of line voltage energizing the system comprising rectifying means connected to said source of line voltage for supplying a direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, means including a first thyratron adapted to be fired to connect said second voltage divider to said direct current supplying means, the firing circuit for said first thyratron including a grid bias circuit connected to the alternating current line voltage and providing an oscillating grid bias voltage having a voltage peak coincident in time with a predetermined point in the cycle of the alternating current line voltage to prevent the firing of the thyratron except at the point in time coincident with the occurrence of said voltage peak, means including a second thyratron adapted to be fired to connect the voltage tap of said second voltage divider to one end of the second voltage divider, a firing circuit for said second thyratron adapted to be responsive to fire said tube at a predetermined time following the firing of said first thyratron and including a grid bias circuit connected to the alternating current line voltage for providing an oscillating grid bias voltage having a voltage peak coincident in time with the recurrence of said predetermined point in the cycle of the alternating current line voltage to prevent the firing of said second thyratron except at the point in time coincident with the occurence of said second thyratron except at the point in time coincident with the ocurrence of said voltage peak.

8. The system for producing a voltage pulse of a duration equal to the timed duration of a predetermined number of cycles of alternating current from the source of line voltage energizing the system comprising rectifying means connected to said source of line voltage for supplying a direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, a first means to connect said second voltage divider to said direct current supplying means coincident in time with a predetermined point in the cycle of said alternating current, means including a series connected resistance and condenser circuit having an adjustable time constant and adapted to be progressively charged from said source of direct current following the connection of said first means, and means connected to said condenser and responsive to a predetermined charge on said condenser to connect the voltage tap of said second voltage divider to one end of the second voltage divider at a predetermined time following the connection of said first means and at a predetermined point in the cycle of said alternating current.

9. The system for producing a voltage pulse of a duration equal to the timed duration of a predetermined number of full cycles of alternating current from the source of line voltage energizing the system comprising rectifying means connected to said source of line voltage for supplying a direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, a first means including a thyratron connected to said second voltage divider and adapted to be fired to connect said second voltage divider to said direct current supplying means coincident in time with a predetermined point in the cycle of the alternating current line voltage, means including a series connected resistance and condenser circuit connected to said source of direct current having an adjustable time constant and adapted to be progressively charged from said source of direct current following the connection of said first means, and means including a second thyratron connected to said condenser and adapted to be fired in response to a predetermined charge on said condenser to connect the voltage tap on said second voltage divider to one end of the second voltage divider at a predetermined time following the connection of said first means and coincident in time with recurrence of the predetermined point in the cycle of the alternating current line voltage.

10. The system for producing a voltage pulse of a duration equal to the timed duration of a predetermined number of full cycles of alternating current from the source of line voltage energizing the system comprising rectifying means connected to said source of line voltage for supplying direct current, a first voltage divider connected to said direct current supplying means and having a voltage tap connected to a first output terminal of the system, a second voltage divider adapted to be connected to said direct current supplying means and having a voltage tap connected to a second output terminal of the system, the voltage pulse appearing as a change of potential difference between said first and second output terminals, means including a first thyratron connected to said second voltage divider and adapted to be fired to connect said second voltage divider to said direct current, the firing circuit for said first thyratron including a grid bias circuit connected to the alternating current supplying means for providing an oscillating grid bias voltage having a voltage peak coincident in time with a predetermined point in the cycle of the alternating current line voltage to prevent the firing of the thyratron except at the point in time coincident with the occurrence of said voltage peak, means including a series resistance and condenser circuit having an adjustable time constant and adapted to be progressively charged from said source of direct current following the firing of said first thyratron, and means including a second thyratron connected to said condenser and adapted to be fired to connect the voltage tap of said second voltage divider to one end of the second voltage divider, a firing circuit for said second thyratron responsive to a predetermined charge on said condenser to fire said second thyratron at a predetermined time following the firing of said first thyratron, said firing circuit also having a grid bias circuit connected to the alternating current line voltage and providing an oscillating grid bias voltage having a voltage peak coincident in time with the recurrence of said predetermined point in the cycle of the alternating current line voltage to prevent the firing of said second thyratron except at the point in time coincident with the occurrence of said voltage peak.

11. The system for producing a voltage pulse of predetermined duration comprising a source of potential, a first means connected to said source for initiating said pulse, a second means connected to said source for terminating said pulse, means connected to said source and to said terminating means for providing a bias potential to prevent the actuation of said second means, and means connected to said bias supplying means for actuating said terminating means comprising a source of alternating current and means connected to said alternating current source for rectifying said alternating current and producing voltage pulses for overcoming said bias potential and actuating said second means.

JOHN W. DAWSON.
DONALD P. FAULK.

REFERENCES CITED

The following references are of record in the file of this patent:

UNITED STATES PATENTS

| Number | Name | Date |
|---|---|---|
| 1,704,791 | Crouse | Mar. 12, 1929 |
| 2,264,175 | Dawson | Nov. 25, 1941 |
| 2,427,687 | Norgaard | Sept. 23, 1947 |
| 2,428,149 | Falk | Sept. 30, 1947 |
| 2,469,934 | Solomon | May 10, 1949 |
| 2,472,041 | Davies | May 31, 1949 |

FOREIGN PATENTS

| Number | Country | Date |
|---|---|---|
| 487,982 | Great Britain | June 29, 1938 |